Sept. 1, 1925.

D. C. BRUMMETT ET AL 1,551,974

ELECTRIC METALLIC ARC WELDING MACHINE

Filed April 6, 1922     4 Sheets-Sheet 1

Inventors:

Sept. 1, 1925.

D. C. BRUMMETT ET AL

1,551,974

ELECTRIC METALLIC ARC WELDING MACHINE

Filed April 6, 1922   4 Sheets-Sheet 3

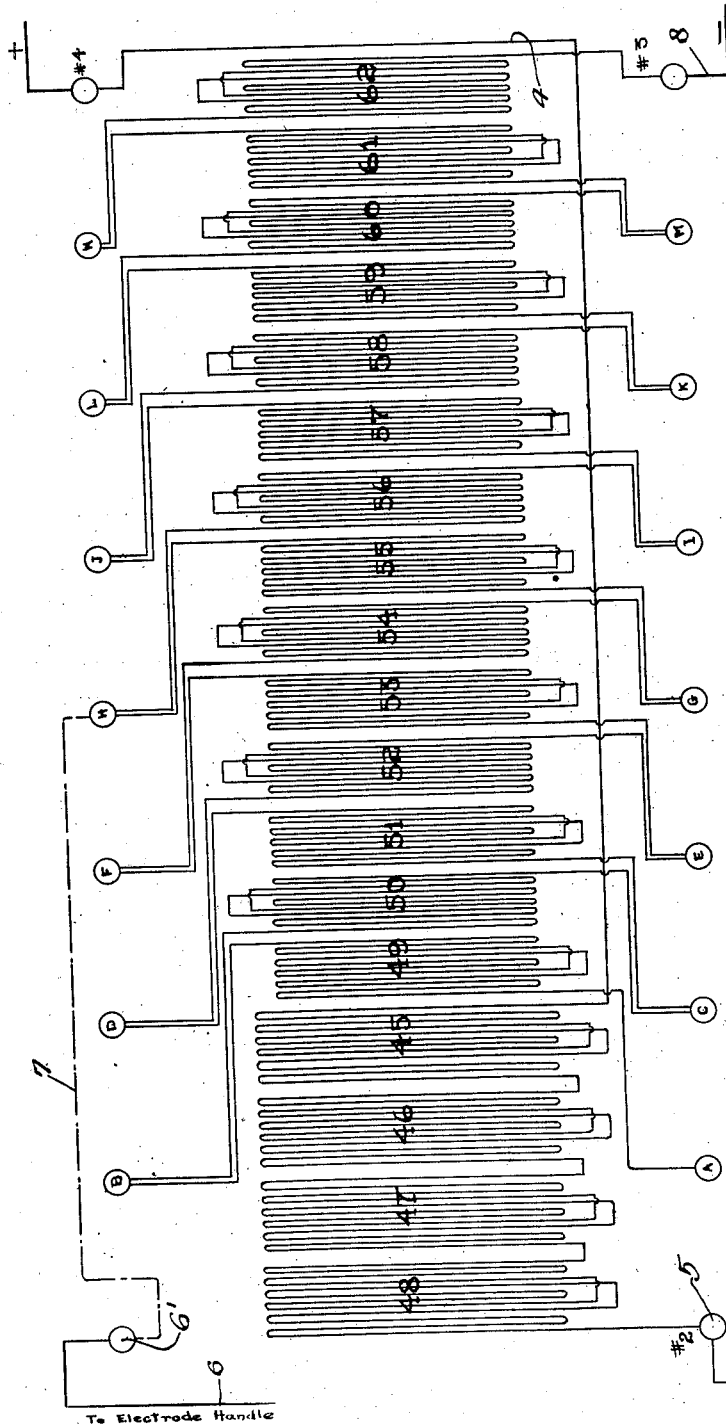

Patented Sept. 1, 1925.

1,551,974

UNITED STATES PATENT OFFICE.

DAVID CHARLES BRUMMETT, GEORGE EARL BRUMMETT, AND GEORGE JOHN GRIEBLER, OF SENECA, KANSAS, ASSIGNORS TO THE SENECA ELECTRIC ARC WELDER COMPANY, OF SENECA, KANSAS, AN EXPRESS TRUST.

ELECTRIC METALLIC-ARC-WELDING MACHINE.

Application filed April 6, 1922. Serial No. 550,209.

*To all whom it may concern:*

Be it known that we, DAVID CHARLES BRUMMETT, GEORGE EARL BRUMMETT, and GEORGE JOHN GRIEBLER, citizens of the United States, residing at Seneca, in the county of Nemaha and State of Kansas, have invented an Electric Metallic-Arc-Welding Machine.

This invention relates to electric welding and similar apparatus intended primarily for utilizing alternating current.

We are aware that apparatus has heretofore been devised for employing alternating current in welding and similar operations upon metals and other alloys, but the present invention seeks to improve upon these devices by providing an apparatus which may be produced at comparatively small expense and will provide a very stable non-sputtering arc having marked penetrating powers, and which may be readily struck and varied in length.

The above mentioned and other objects of a character more closely related to the details of construction of the embodiment of the invention disclosed hereinafter in detail are accomplished by providing an apparatus which includes a plurality of resistance elements arranged in series in the welding circuit.

The resistance element consists of a plurality of coils reversely wound, preferably about an iron or metallic core so that the direction of flow of the current is alternately reversed as it passes from one coil to the other.

In the accompanying drawings, we have shown one form of a device disclosing the invention, and in these drawings:

Fig. 6 is a wiring diagram, and

Figure 7:
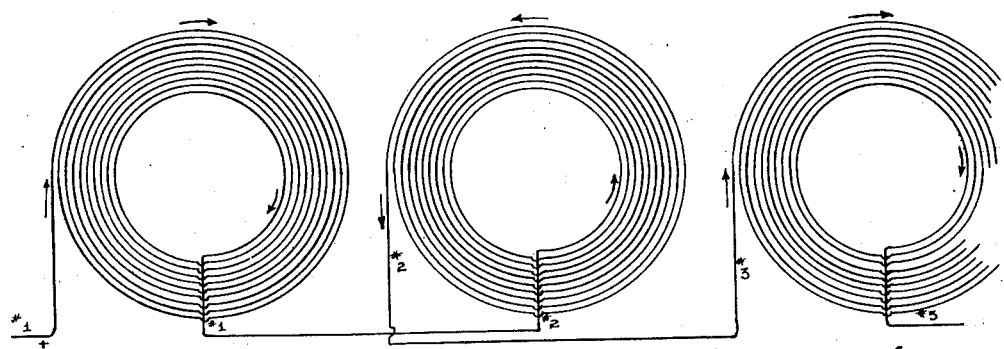
Fig. 7 is a diagrammatic view showing the development of one of the resistance elements.

Referring to the drawings for a more detailed description, and more particularly to Figs. 6 and 7, the numerals 48 to 62, inclusive, indicate a plurality of resistance elements, each element comprising a plurality of coils reversely wound so that the flow of current is reversed as it passes from one coil to another. The coils are preferably of the pancake type, and their construction is more clearly disclosed in Fig. 7, wherein there is diagrammatically shown an individual coil. 1 indicates a coil in which the current flows in the clockwise direction indicated by the arrow. The current passes from the coil 1 to the coil 2, wherein its direction is reversed, and flows in a counter-clockwise direction; from the coil 2 the current passes to the coil 3 which causes it to flow in its original or clockwise direction.

Referring to Fig. 6, 4 indicates a lead which conducts the current to the resistance element 45 from any suitable generating source to which a lead is connected by means of a simple circuit.

The current pases through coils 45, 46, 47, 48, the coils being arranged in series, and from the last mentioned coil, flows to the ground connection indicated at 5. The current pases through the arc and the electrode handle (not shown) on a lead 6 to a binding post 6', to which is also connected a lead 7 having a connector plug 7' insertable in any selected one of a plurality of taps A, B, C, D, etc. These taps serve to place in the circuit a number of the resistance elements 49 to 62, inclusive, depending upon the tap into which the plug 7' is inserted. The latter resistance elements are of the same construction as the resistance elements 45 to 48, but it will be noted that they have only two coils each and are located on the opposite side of the circuit from the first mentioned coils.

It will be understood that by connecting the lead 7 to a tap further to the left than the tap H, to which it is shown as connected in Fig. 6, the number of resistance elements in the circuit may be increased. After passing through the resistances being used the current flows through the lead 8 which is the other side of the line of the applied pressure.

Figure 4:
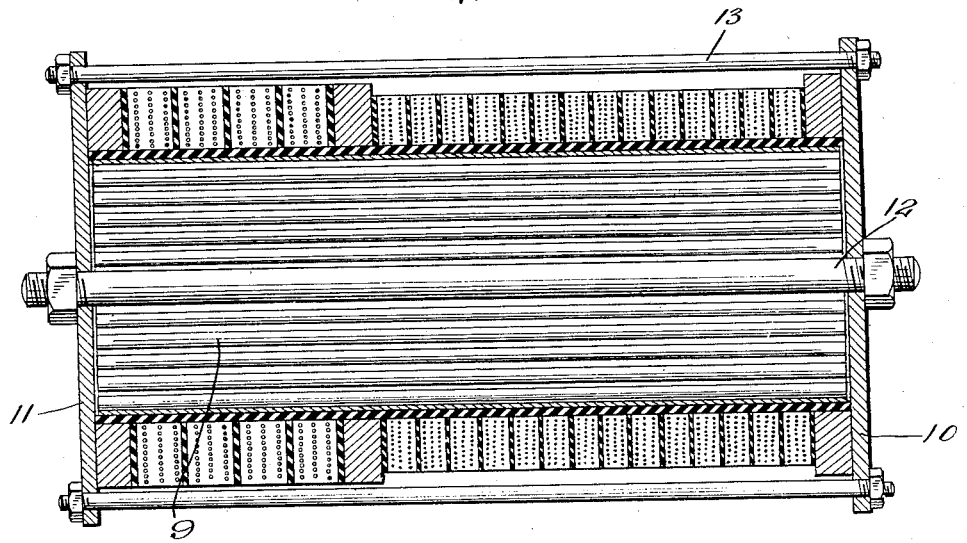
Fig. 4 is a longitudinal section taken through the core containing the resistance elements.
Figure 5:
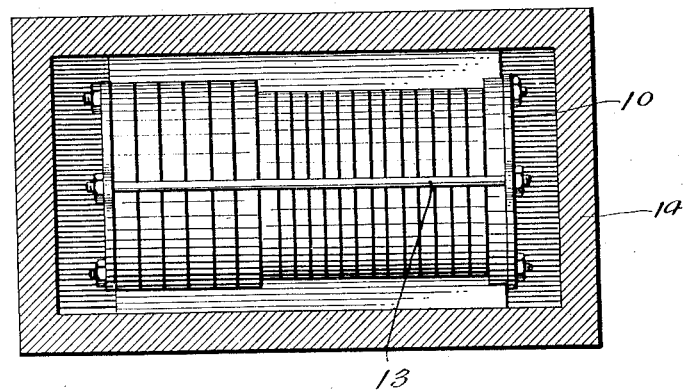
Fig. 5 is a horizontal section on the line 5—5 of Fig. 2.

The resistance elements are located in series and preferably have an iron core 9 (Fig. 4) upon which they are maintained by means of end plates 10, 11; a central rod 12 and exterior rods 13 pass through the end plates and hold them in position.

Figure 1:
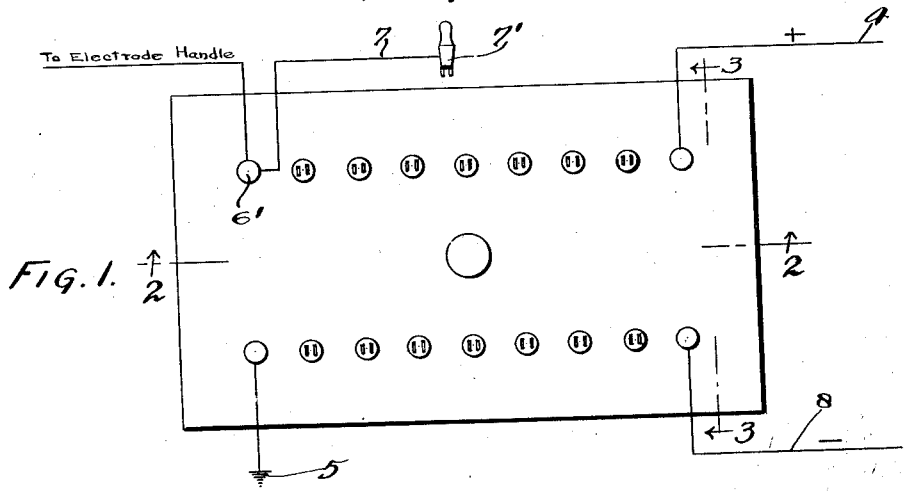
Fig. 1 is a top plan view.
Figure 2:
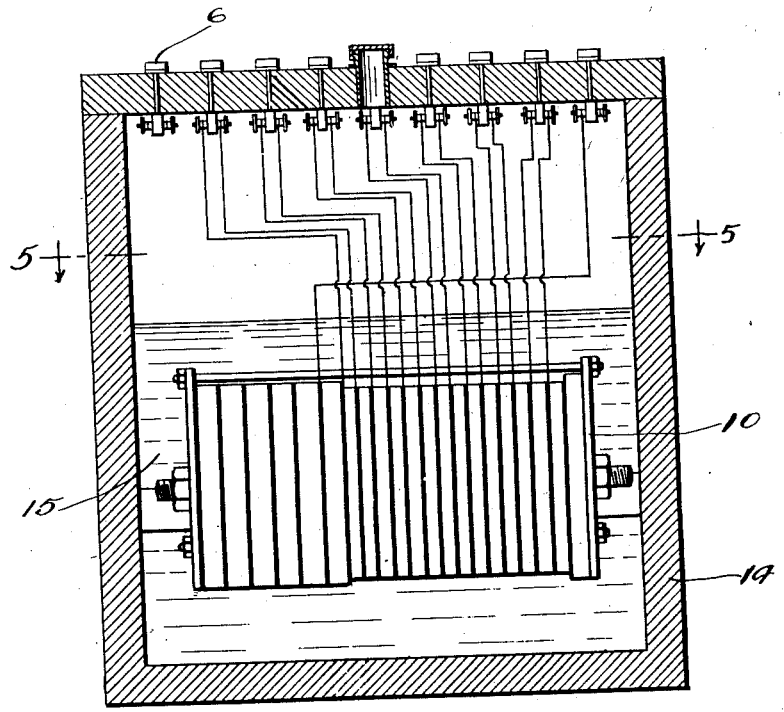
Fig. 2 is a vertical section on the line 2—2 of Fig. 1.
Figure 3:
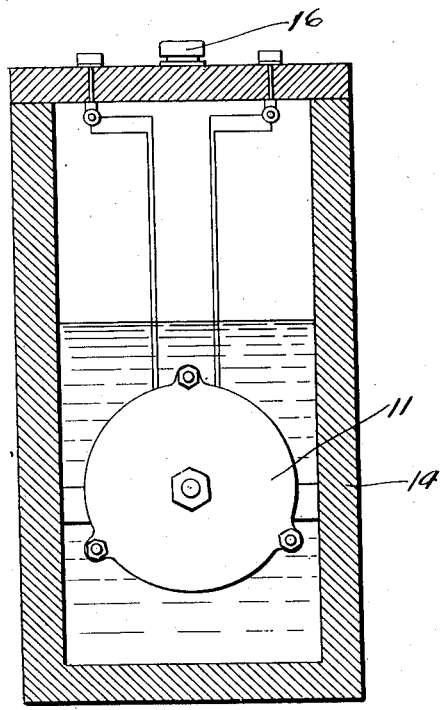
Fig. 3 is a vertical section taken on the line 3—3 of Fig. 1, looking in the direction of the arrows.

The resistances are enclosed by a casing 14 (Fig. 2) and are submerged in oil 15, or any other suitable cooling medium which may be introduced into the casing through an inlet port 16.

In using an arc welder embodying this invention, it has been found that the arc is extremely stable and may be lengthened or shortened considerably by varying the resistance through use of the taps A, B, C, D, etc. The arc does not sputter; it is readily struck, and its penetration is highly satisfactory.

By reversing the flow of current in the adjoining coils of the resistance elements, the magnetic field set up by one series of convolutions of the coil is counteracted by that of the reversably wound convolutions, and the effects of self-inductance are reduced to a minimum.

By providing the coils with a metallic core the number of lines of flux radiating from each coil is accordingly greater, due, presumably, to the permeability of the metal of the core, but since the reversely wound coil sections are also provided with a metallic core, the effects of the lines of flux radiating from opposite windings will be neutralized as thoroughly as if no iron core was provided. Yet such reverse winding does not affect the mutual inductance of the coils, and consequently there is maintained a desirable amount of reactive effect sufficient to lag the current behind the voltage so that when the voltage and current reach the zero point, they are out of phase and the arc does not tend to go out and become unstable at the zero point of the wave, as would be the case if the voltage and current were in phase.

It will be understood that numerous modifications may be made in the illustrated embodiment of the invention without departing from the scope of the invention, which is more clearly set forth in the following claims.

We claim:

1. In a welding circuit, an apparatus of the class described for using alternating current including a plurality of resistance elements, means for placing any selected number of said elements in series in the welding circuit, each element consisting of a plurality of oppositely wound coils adapted to direct the current in opposite directions.

2. In a welding circuit, an apparatus of the class described for using alternating current including a plurality of resistance elements, means for placing any selected number of said elements in series in the welding circuit, each element consisting of a plurality of oppositely wound coils adapted to direct the current in opposite directions, and a metallic core for said coils.

3. In a welding circuit, an apparatus of the class described utilizing alternating current and including a plurality of resistance elements connected in series, a plurality of taps between said elements whereby any selected number thereof may be introduced into the welding circuit, each element consisting of a pair of oppositely wound coils adapted to reverse the flow of current as it passes from one coil to the other.

4. In a welding circuit, an apparatus of the class described utilizing alternating current and including a plurality of resistance elements connected in series, a plurality of taps between said elements whereby any selected number thereof may be introduced into the welding circuit, each element consisting of a pair of oppositely wound coils adapted to reverse the flow of current as it passes from one coil to the other, and an iron core for said coils.

5. In a welding circuit, an apparatus of the class described utilizing alternating current and including a plurality of resistance elements connected in series in the welding circuit, each element consisting of a plurality of oppositely wound coils adapted to direct the current in opposite directions.

6. In a welding circuit, an apparatus of the class described utilizing alternating current and including a plurality of resistance elements connected in series in the welding circuit, each element consisting of a plurality of oppositely wound coils adapted to direct the current in opposite directions, and a metallic core for said coils.

7. In a welding circuit, a variable resistance comprising in a unitary structure, a plurality of coils connected in series, each of said coils comprising sections of reverse winding whereby the self-inductance of the coil is minimized, each of said coils being provided with a tap at either end thereof to permit variation in the resistance of the unit; a metallic core passing through the series of coils, and side plates connected by a plurality of rods for holding the unit in assembled position.

8. A variable resistance for welding circuits comprising, in combination, a metallic core, a plurality of pancake coils surrounding said core and connected in series with each other, each of said coils comprising a plurality of windings opposed in direction whereby the reversal of direction in the flow of current through each coil serves to minimize the self-inductance in the coil; a plurality of taps in the connections between adjacent coils; plates at either end of said tubular core, and extending beyond the circumferences of adjacent coils; and tie rods connecting said plates to hold the coils in assembled position upon said core.

DAVID CHARLES BRUMMETT.
GEORGE EARL BRUMMETT.
GEORGE JOHN GRIEBLER.